US012750216B2

(12) United States Patent
Wang et al.

(10) Patent No.: US 12,750,216 B2
(45) Date of Patent: Sep. 29, 2026

(54) SECURE SEARCHABLE ENCRYPTION WITH SEMI-HIDDEN ACCESS CONTROL

(71) Applicant: Dell Products L.P., Round Rock, TX (US)

(72) Inventors: Zijia Wang, London (GB); Mustafa AlBado, Cork (IE); Srinath Kappgal, Cork (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/040,584

(22) Filed: Jan. 29, 2025

(65) Prior Publication Data

US 2026/0222198 A1 Jul. 30, 2026

(51) Int. Cl.
*H04L 9/14* (2006.01)

(52) U.S. Cl.
CPC .................................... *H04L 9/14* (2013.01)

(58) Field of Classification Search
CPC .................................................. H04L 9/14
See application file for complete search history.

(56) References Cited

U.S. PATENT DOCUMENTS 10,348,700 B2 * 7/2019 Auradkar ................ G06F 16/81
10,742,407 B2 * 8/2020 Jin ........................ H04L 9/0866
10,812,506 B2 * 10/2020 Canard ................... H04L 63/20
11,550,833 B2 * 1/2023 Woodworth ............ G06F 40/30
11,784,815 B2 * 10/2023 Xu ........................ H04L 9/3239
11,824,982 B1 * 11/2023 Ma ........................ H04L 9/0872
11,973,889 B2 * 4/2024 Han ........................ H04L 9/008
12,393,722 B2 * 8/2025 Kawai ....................... H04L 9/30
2019/0394038 A1 * 12/2019 Sanders .................... H04L 9/08
2021/0081562 A1 * 3/2021 Hirano ...................... H04L 9/06
2024/0333494 A1 * 10/2024 Park ........................ H04L 9/088
2024/0348455 A1 * 10/2024 Huang .................. H04L 9/0861

* cited by examiner

*Primary Examiner* — Viral S Lakhia
(74) *Attorney, Agent, or Firm* — Fogarty LLP

(57) ABSTRACT

A system for secure searchable encryption with semi-hidden access control is disclosed. The system enhances data privacy and security by segregating attribute names from their encrypted values, allowing attribute names to remain in plaintext for search operations while keeping attribute values confidential. A trapdoor privacy module generates encrypted trapdoors using a secret cryptographic element and a hash function, ensuring keyword security even if trapdoors are intercepted. The system stores encrypted data and indices on a cloud server, facilitating secure search operations without exposing sensitive data. A ciphertext authenticity module verifies the integrity of ciphertexts using digital signatures, ensuring data authenticity and protection against unauthorized modifications. This approach enables data users to perform secure keyword searches on the cloud server, retrieving requested data without revealing search keywords, thereby providing a robust framework for secure searchable encryption.

18 Claims, 5 Drawing Sheets

SECURE SEARCHABLE ENCRYPTION WITH SEMI-HIDDEN ACCESS CONTROL

BACKGROUND

As the value and use of information continues to increase, individuals and businesses seek additional ways to process and store information. One option is an Information Handling System (IHS). An IHS generally processes, compiles, stores, or communicates information or data for business, personal, or other purposes. Technology and information handling needs and requirements can vary between different applications. Thus, IHSs can also vary regarding what information is handled, how the information is handled, how much information is processed, stored, or communicated, and how quickly and efficiently the information can be processed, stored, or communicated. The variations in IHSs allow systems to be general or configured for a specific user or specific use such as financial transaction processing, airline reservations, enterprise data storage, internet of things (IOT) monitoring and communications, or global communications. In addition, IHSs can include a variety of hardware and software resources that can be configured to process, store, and communicate information and can include one or more computer systems, graphics interface systems, data storage systems, and networking systems. IHSs can also implement various virtualized architectures. Data communications among information handling systems may be via networks that are wired, wireless, optical or some combination.

Searchable encryption allows for encryption of stored data while still enabling search for keywords. IHSs may be used to enable users to search encrypted records without decrypting an entire database. Existing searchable encryption systems are vulnerable to malicious attack vectors that can compromise the confidentiality of the search keywords, and are at risk to potential privacy breaches where intermediaries might access sensitive attribute values, which may allow unauthorized entities to manipulate data, and are not fully prepared to handle emerging database threats.

SUMMARY

The searchable encryption system disclosed herein is designed to provide a system that is resistant to various attacks, particularly keyword guessing and advanced cryptographic attacks. The data confidentiality is protected so that the data cannot be accessed by unauthorized parties either while in storage or during transmission. The system guarantees integrity by ensuring that any alterations to the data can be reliably detected and traced back to their origin. As a result, authorized users have consistent and reliable access to the data when needed.

The solution introduced herein includes several groundbreaking components that differentiate it from existing searchable encryption methods. Each of these components is designed not only to enhance security but also to improve functionality and efficiency, which addresses specific limitations of traditional systems.

Attribute Separation Module: The system uses an advanced mechanism for segregating attribute names from their encrypted values. This feature is absent in conventional systems where attributes are typically stored without clear separation, which could inadvertently expose sensitive data during search operations. The method ensures that while attribute names are searchable, their associated values remain confidential, which significantly enhances privacy and security.

Trapdoor Privacy Module: The system utilizes a novel trapdoor generation mechanism involving secret keys. Traditional approaches often rely on deterministic or simple randomized methods, which can be vulnerable to reverse engineering. In contrast, the approach disclosed herein employs a sophisticated hash-based encryption process that secures trapdoors against such vulnerabilities, ensuring that no information about the underlying keywords is revealed.

Ciphertext Authenticity Module: The system implements a robust mechanism using digital signatures to verify the authenticity and integrity of ciphertexts. While many existing systems lack effective mechanisms to ensure data integrity, the approach disclosed herein uses digital signatures to detect any unauthorized modifications to the ciphertext, thereby safeguarding data against tampering.

BRIEF DESCRIPTION OF THE DRAWINGS

Figure 1:
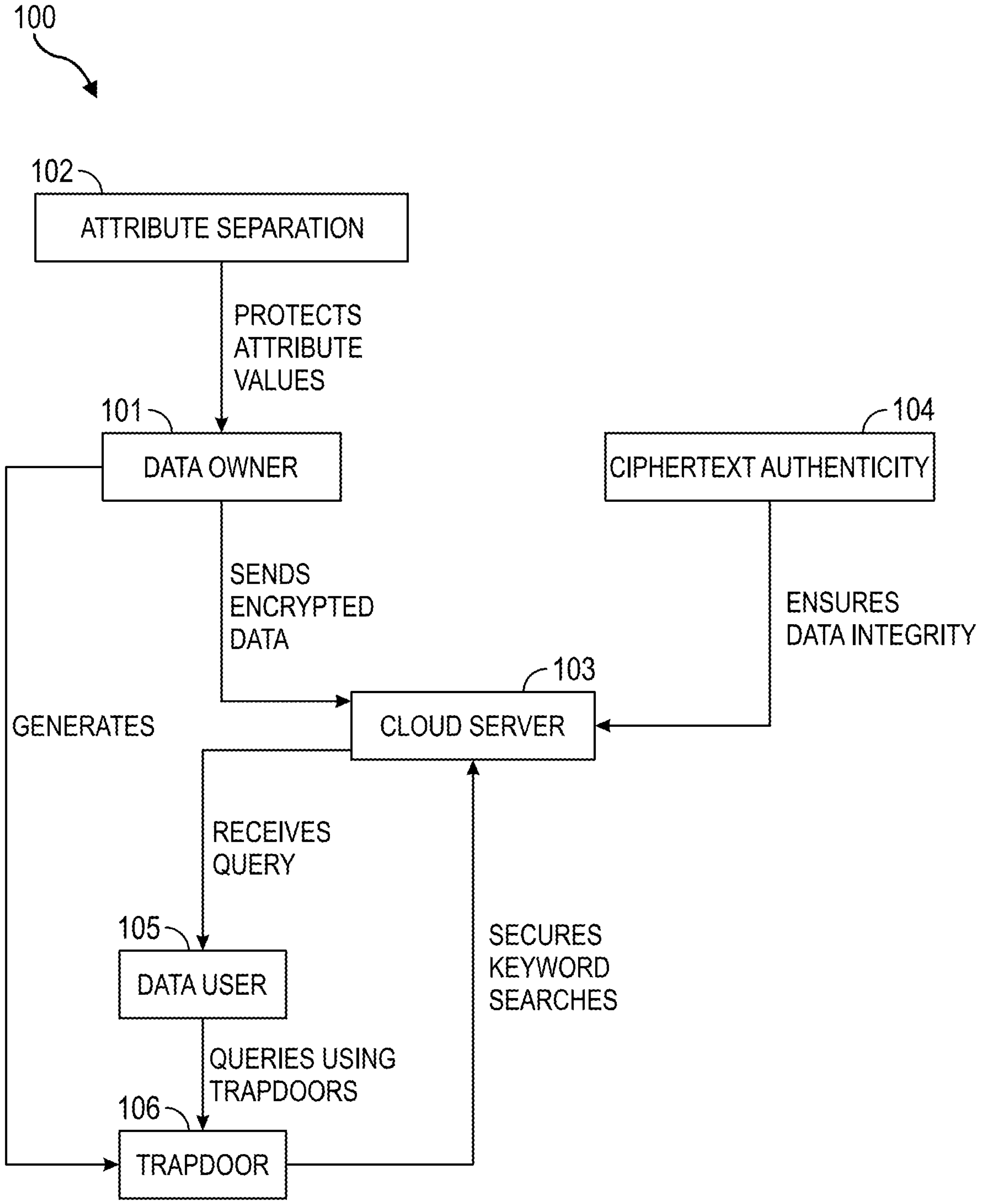

Having thus described the invention in general terms, reference will now be made to the accompanying drawings, which are not necessarily drawn to scale, and wherein:

FIG. 1 is an overview of the architecture of the searchable encryption method.

Figure 2:
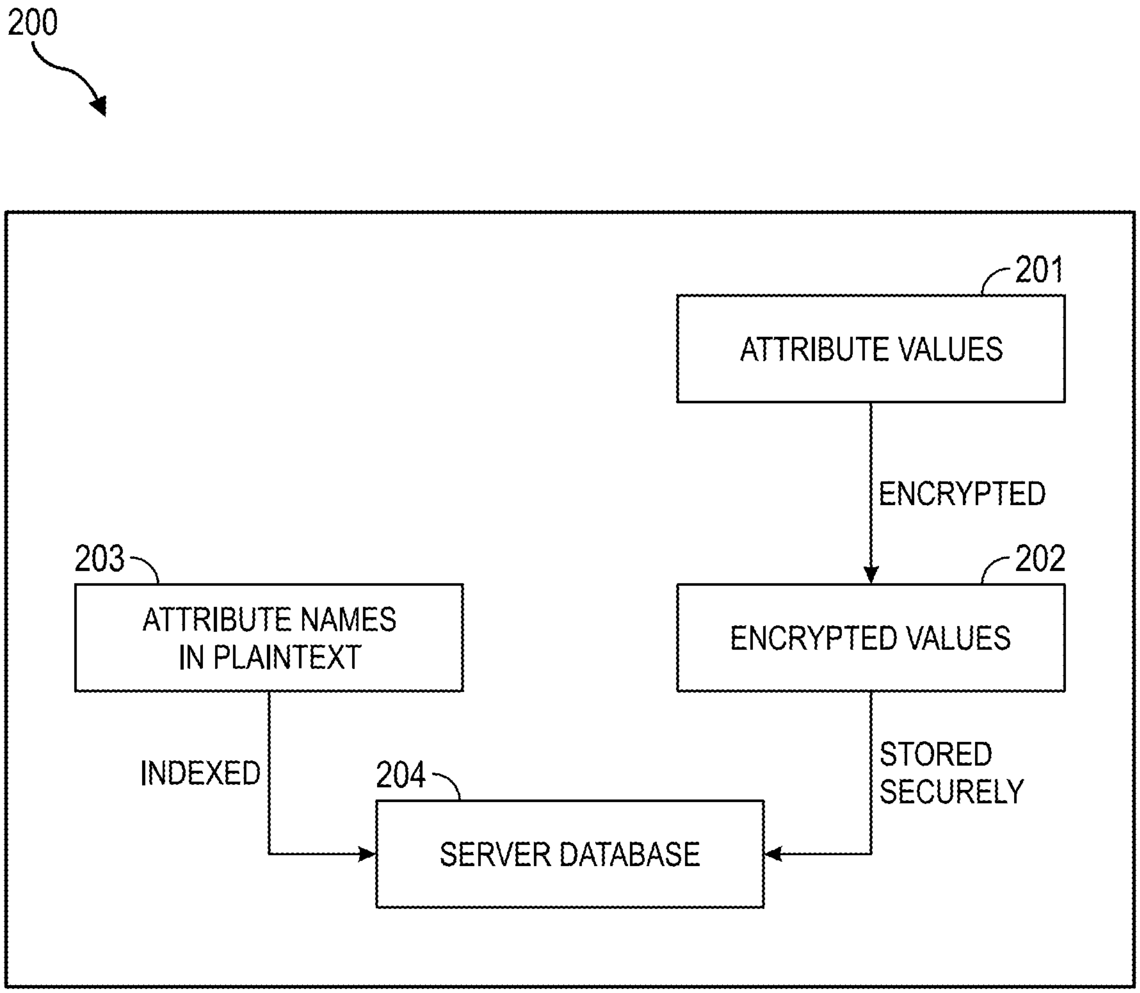

FIG. 2 illustrates an example attribute separation module that enhances the privacy and security of the searchable encryption system.

Figure 3:
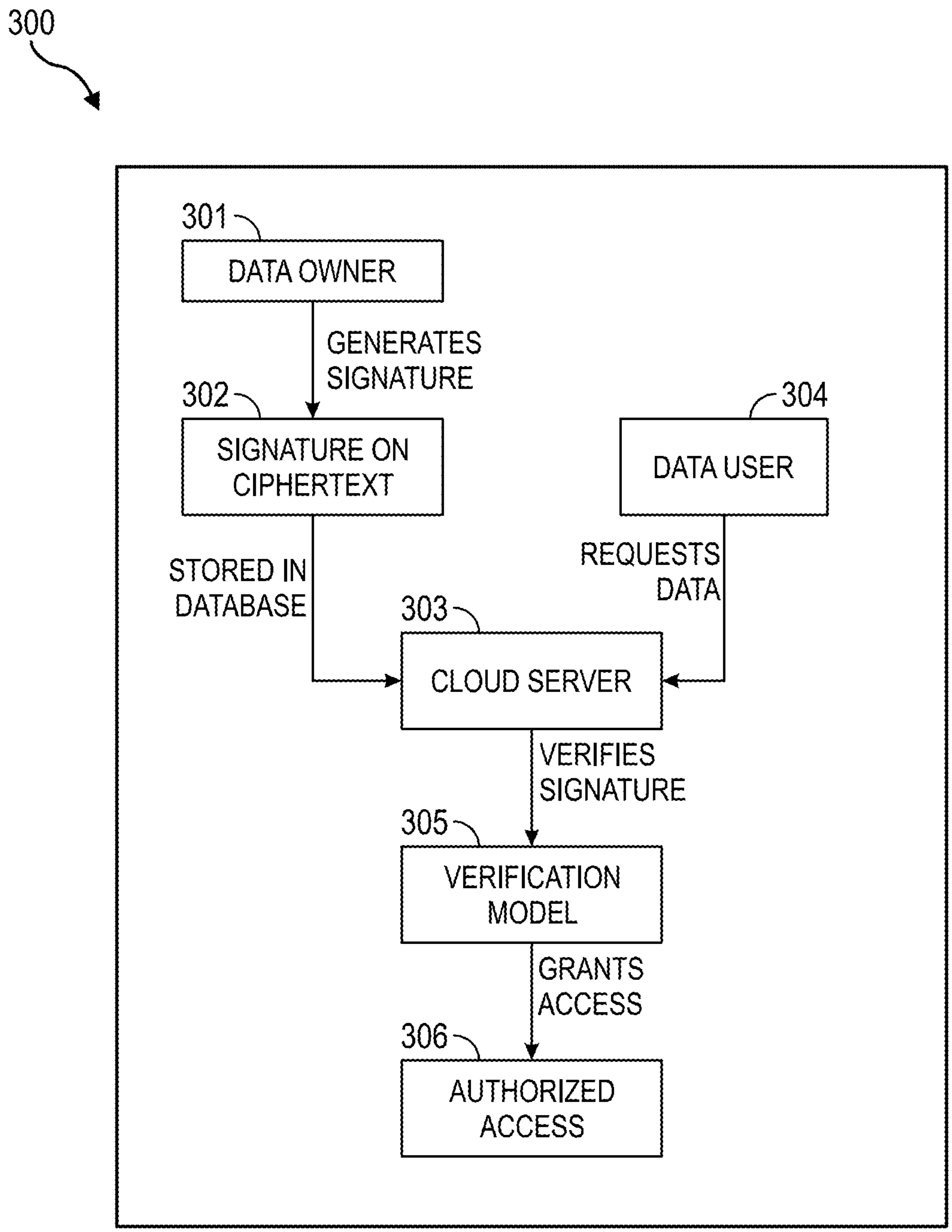

FIG. 3 illustrates a ciphertext authenticity module according to one embodiment.

Figure 4:
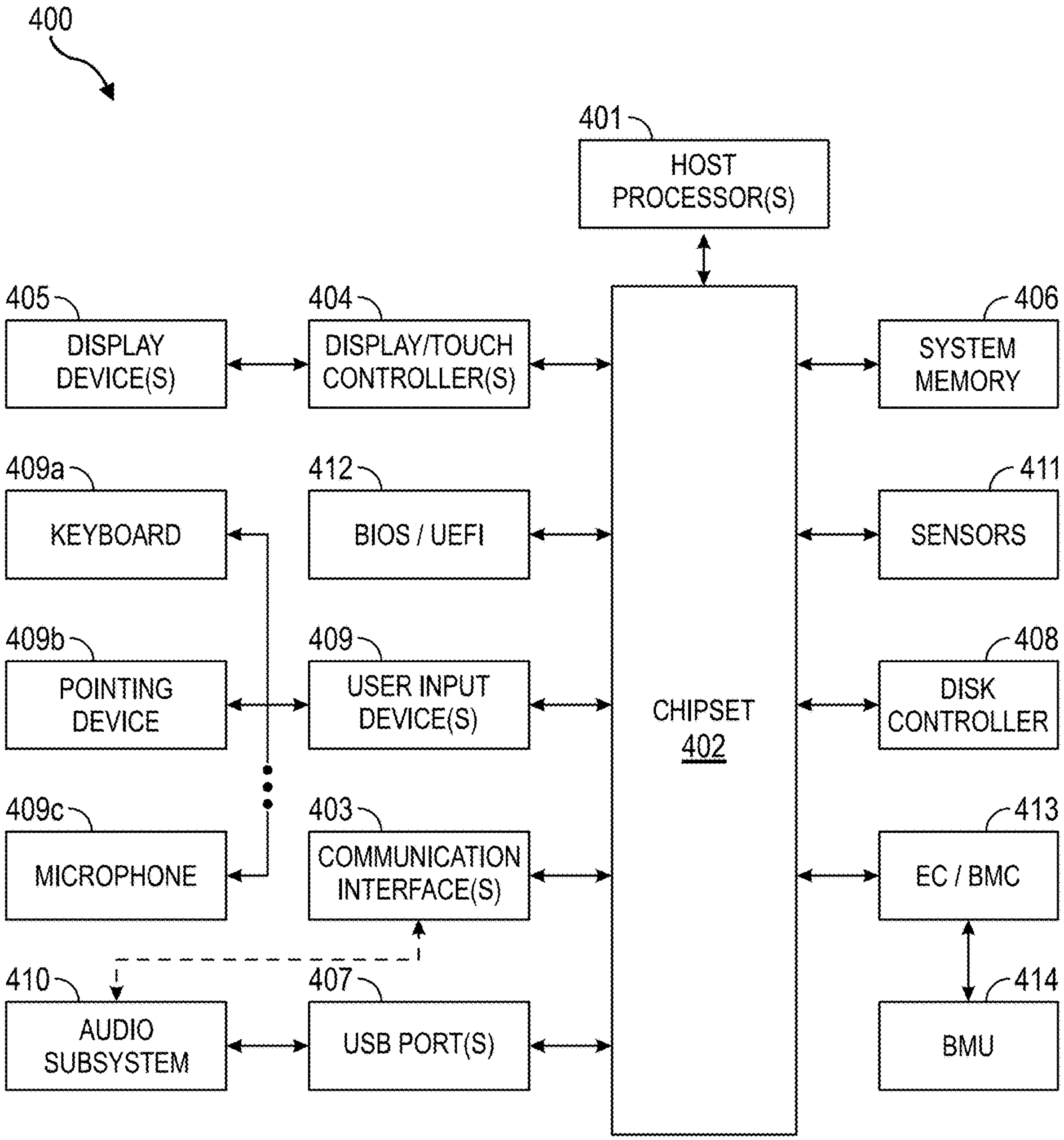

FIG. 4 shows an example of an Information Handling System (IHS) configured to implement systems and methods as described herein for secure searchable encryption with semi-hidden access control.

Figure 5:
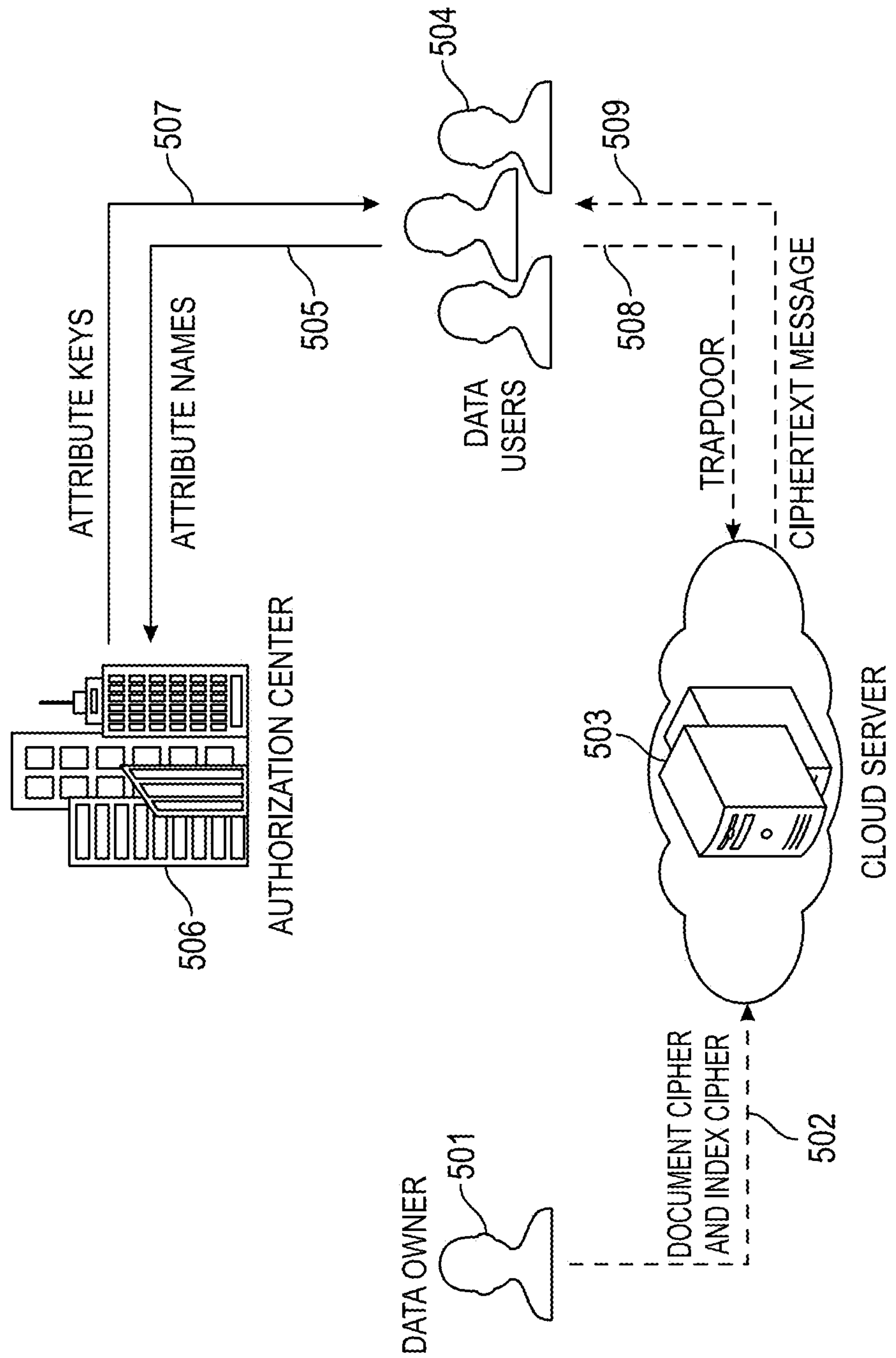

FIG. 5 illustrates an example use case for system using secure searchable encryption with semi-hidden access control.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Searchable encryption addresses the need to search over encrypted data without compromising privacy. Early research in the field introduced the concept of Public Key Encryption with Keyword Search (PEKS). However, PEKS schemes were vulnerable to keyword guessing attacks, wherein an adversary could recover the keyword from a given trapdoor. To mitigate this problem, researchers proposed Public-key Authenticated Encryption with Keyword Search (PAEKS), which authenticates the encrypted keyword to prevent such attacks. Further advancements led to the development of dynamic searchable encryption schemes that resist keyword guessing attacks (SDKSE-KGA). These schemes support functionalities such as dynamic updating of keywords and files while maintaining constant-size indexes and trapdoors. Additionally, verifiable and resistant schemes such as VR-PEKS have been proposed to address keyword guessing attacks and quantum attacks. However, the existing solutions do not address the separation of attribute names from values, which leaves them susceptible to privacy breaches. The attribute-based searchable encryption (ABSE) approach aims to achieve efficient search by attributes in encrypted datasets. While ABSE schemes enhance security by specifying access control policies, they still do not fully conceal attribute values from intermediaries.

Moreover, the generation of trapdoors in searchable encryption has often been deterministic, which leads to potential security risks. Probabilistic trapdoor generation has been introduced to address this issue to provide stronger security guarantees. Authenticity verification in searchable encryption is another area that has seen significant development. Multi-factor authentication and verification schemes have been introduced to add an extra layer of security to data access with searchable encryption.

Despite considerable advancements in searchable encryption, several challenges remain unaddressed, which poses significant risks to data privacy and security. These challenges include:

1) Attribute Privacy: Most existing schemes do not effectively separate attribute names from attribute values, leading to potential privacy breaches where intermediaries might access sensitive attribute values.

2) Trapdoor Security: Traditional trapdoor mechanisms in searchable encryption are often deterministic, making them vulnerable to various attack vectors that can compromise the confidentiality of the search keywords.

3) Data Authenticity: There is a lack of robust mechanisms to verify the authenticity of ciphertexts, which raises concerns about the integrity and security of the data, especially in scenarios where data manipulation by unauthorized entities is possible.

4) Comprehensive Security Against Advanced Threats: Existing solutions are not fully prepared to handle emerging threats, such as quantum attacks, which necessitate the development of forward-looking encryption technologies.

The disclosure herein proposes a novel system that addresses these challenges to ensure a comprehensive and secure searchable encryption system. The system and methods disclosed herein introduce a unique, semi-hidden access policy that separates attribute names from their encrypted values, which remain undisclosed to any third parties including the server facilitating the searches. A secure trapdoor generation method uses a secret key that enables safe transmission over public networks without exposing search keywords. Furthermore, an authenticity verification system for ciphertexts ensures that only the rightful data owner can generate and validate keyword-indexed data, thereby protecting against data manipulation. These components significantly differentiate this system from previous methods and provide enhanced security in searchable encryption.

The embodiments disclosed herein provide secure searchable encryption with semi-hidden access control. Traditional searchable encryption methods often leave sensitive data susceptible to security risks, such as keyword guessing attacks, that compromise both the privacy and integrity of data. To address these deficiencies, the present disclosure introduces a system and method that fortifies the security of searchable encryption in a way that is tailored to resist attacks and enhance data integrity. This system employs a semi-hidden access policy that distinguishes between attribute names and encrypted attribute values, thereby restricting third-party access to sensitive data. Attribute names and their corresponding attribute keys are distributed among authorized data users, and data owners send encrypted documents and indices directly to a cloud server, thereby ensuring that no sensitive data is exposed.

The system utilizes the encrypted trapdoors for secure keyword searches. Encrypted trapdoors are generated using a secret key by the data owner. The trapdoors are used by data users to query the cloud server without revealing the underlying keywords, which safeguards trapdoor confidentiality even over public networks. Moreover, the system guarantees the authenticity of ciphertexts, ensuring that only legitimate data owners can produce and validate keyword-indexed ciphertexts, which protects against potential data manipulation.

The solution disclosed herein comprises three components. First, an innovative attribute-separation mechanism encrypts attribute values while exposing only attribute names, which significantly enhances data privacy. Second, a robust trapdoor privacy mechanism allows encrypted trapdoors to be securely communicated and used over public networks. Third, a rigorous ciphertext authenticity system is used, wherein only the data owner can produce and authenticate keyword-indexed ciphertexts, which effectively guards against unauthorized data alterations. This solution offers substantial value by enhancing the security framework for searchable encryption solutions, which is crucial for clients dealing with highly sensitive information. In the cybersecurity market, it provides clients with advanced, reliable encryption services and reinforces their confidence in the security and confidentiality of their data.

FIG. 1 is an overview of architecture 100 of the searchable encryption method. Each component is designed to address specific vulnerabilities identified in traditional searchable encryption systems. The method involves a semi-hidden access policy that separates attribute names from their encrypted values, sophisticated trapdoor generation using secret keys, and a robust mechanism for ciphertext authentication. This system architecture ensures that the encrypted data, trapdoor generation, and query process are secure and efficient, effectively mitigating risks associated with keyword guessing attacks, unauthorized data access, and data manipulation.

A data owner 101 uses an attribute separation module 102 to protect attribute values. The data owner 101 sends encrypted data to a cloud server 103. A ciphertext authenticity module 104 is used to ensure data integrity in the cloud server 103. Data users 105 search for and access the encrypted data in the cloud server 103 using a trapdoor module 106. Queries are sent from data user 105 to trapdoor module 106. The data owner 101 provides attributes for the encrypted data values to the trapdoor module 106. The trapdoor module 106 receives queries from the data users 105 and creates secure keyword searches into cloud server 103 to retrieve the requested data for data user 105.

FIG. 2 illustrates an example attribute separation module 200, which enhances the privacy and security of the searchable encryption system. The attribute separation module 200 is designed to segregate attribute names from their corresponding values, thereby only exposing the names to potential queries while keeping the values encrypted and hidden from unauthorized access.

Data entries comprise attribute values and associated attribute names. The attribute values 201 are encrypted to create encrypted values 202. The attribute names 203 stay in plaintext and are used to index the encrypted values 202, which are stored securely in a server database 204, such as cloud server 103 (FIG. 1).

The attribute names 203 are kept in plaintext to maintain their usability in search operations. On the other hand, the attribute values 201 are encrypted using a robust symmetric encryption scheme. This ensures that attribute values 201 remain confidential and are never exposed to the server or any intermediate entities. The attribute separation module 200 operates by encrypting attribute values 201 using a symmetric encryption scheme before storing the encrypted values 202 on a server database 204. The attribute names 203 remain in plaintext, which allows them to be searchable without revealing the content of the attribute values 201.

An encryption process is applied to the attribute values 201. The encryption of attribute values 201 can be represented by the following equation:

$$C_v = Enc_k(V) \quad \text{(Eq. 1)}$$

where V represents the attribute values 201, k is the symmetric encryption key, and Cv is the ciphertext of the encrypted values 202.

An indexing mechanism facilitates efficient search by generating an encrypted index for each attribute name. This enables quick retrieval without compromising the encryption of attribute values. The indexing is described by the equation:

$$I_n = \text{Hash}(N) \quad \text{(Eq. 2)}$$

where N is the attribute name, and In is the hash-based index, which supports efficient lookup operations.

This proposed module not only ensures the confidentiality of attribute values 201 but also maintains the integrity and accessibility of the attribute names 203 for effective searchable operations. The method significantly reduces the risk associated with traditional searchable encryption models where insufficient separation of attributes could lead to data leaks and security breaches.

The searchable encryption method also uses a trapdoor privacy module, which represents a critical advancement in searchable encryption technology. Unlike traditional systems that often use a deterministic or simple randomized trapdoor generation, the embodiments herein incorporate a sophisticated mechanism using a secret key that not only enhances security but also maintains the confidentiality of the search keywords against potential attacks, including those from quantum computers.

The trapdoor privacy module generates trapdoors for keyword searches in a way that prevents any third party from deducing the keyword from the trapdoor itself, which was a significant vulnerability in earlier systems.

The trapdoor generation involves a multi-layered cryptographic process detailed by the equation:

$$T_k = Enc_s(H(k)) \quad \text{(Eq. 3)}$$

where Tk is the trapdoor keyword, k is the search keyword, H is a cryptographic hash function, which adds a layer of randomness and complexity, and s is a secret key used in the encryption process. This formula ensures that even if the trapdoor Tk is intercepted, the underlying keyword k remains secure.

The secret keys are distributed securely using a key exchange protocol that ensures only authorized users can receive and use them for generating or interpreting trapdoors, thereby mitigating any risk of unauthorized access or leakage. This module represents an improvement over existing methods by incorporating advanced cryptographic techniques and a robust key distribution system, ensuring a high level of security and privacy in searchable encryption practices.

FIG. 3 illustrates a ciphertext authenticity module 300 according to one embodiment. The ciphertext authenticity module 300 is designed to safeguard against unauthorized modifications and forgeries of encrypted data. This is a vulnerability often overlooked in conventional searchable encryption systems. The ciphertext authenticity module 300 uses a combination of digital signatures and hash functions to verify the integrity and authenticity of the data before it is accessed or decrypted by authorized users.

The ciphertext authenticity module 300 enhances the security of ciphertexts by ensuring that each piece of data can be authenticated back to its original owner. This is accomplished using cryptographic signatures that are impossible to forge without access to the owner's private key.

A data owner 301 generates a digital signature of the ciphertext 302. The signature 302 is stored to a database 303, such as a cloud server 103 (FIG. 1). Data users 304 request data from the database 303, which accesses a verification module 305 to confirm that the data has not been altered since being signed by the data owner. If the authenticity of the data is confirmed, then the data user 304 is granted access 306 to the data.

Signature Generation and Verification:

The authenticity of each ciphertext is secured through a process represented by the following equation:

$$C_{sig} = \text{Sign}_{sk}(H(C)) \quad \text{(Eq. 4)}$$

where C is the ciphertext of the data, H is a cryptographic hash function, sk is the private key of the data owner, and Csig is the digital signature 302 of the ciphertext.

This signature 302 ensures that any alterations to the ciphertext after it has been signed will invalidate the signature, thereby alerting the system to potential tampering.

Authenticity Check at Access:

When a query results in a ciphertext being fetched, the following a verification process occurs as represented by the following equation:

$$\text{Verify}_{pk} = (C_{sig}, H(C)) \quad \text{(Eq. 5)}$$

where pk is the public key corresponding to the private key sk.

This step confirms that the ciphertext has not been altered since it was signed by the data owner 301, thereby ensuring the integrity of the data. This module provides a robust mechanism for ensuring that all accessed data remains true to its original form, significantly enhancing security against data breaches and unauthorized modifications.

In an example use case, a cloud-based storage system contains sensitive client data, such as proprietary software source codes, client databases, and confidential business documents. Utilizing the searchable encryption system disclosed herein, storage system administrators can offer clients enhanced data privacy, robust security measures, and guaranteed data integrity. The attribute separation module ensures that while client names and project titles are searchable, sensitive details such as the contents of documents and software codes remain fully encrypted and hidden from both the storage system administrator and any potential intruders. The trapdoor privacy module enables clients to securely search through their encrypted data without risking the exposure of their search criteria or the security of their stored data. The ciphertext authenticity module ensures that the data retrieve by users has not been altered since its encryption by a data owner, thereby providing users with confidence when accessing critical business information.

FIG. 4 shows an example of an Information Handling System (IHS) 400 configured to implement systems and methods as described herein for secure searchable encryption with semi-hidden access control. IHS 400 may be used as cloud server 103, or 303, server database 204, or may host attribution separation modules, trapdoor privacy modules, and/or ciphertext authenticity modules used to secure store and search data. Alternatively, IHS 400 may be used by a data owner and/or data user to search for and access secure encrypted data.

As depicted, IHS 400 includes host processor(s) 401. In various embodiments, IHS 400 may be a single-processor system, or a multi-processor system including two or more processors. Host processor(s) 401 may include any processor capable of executing program instructions, such as an INTEL/AMD ×76 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 400 includes chipset 402 coupled to host processor(s) 401. Chipset 402 may provide host processor(s) 401 with access to resources. In some cases, chipset 402 may utilize a QuickPath Interconnect (QPI) bus to communicate with host processor(s) 401. Chipset 402 may also be coupled to communication interface(s) 403 to enable communications between IHS 400 and various wired and/or wireless networks, such as Ethernet, WiFi (IEEE 802.11), Bluetooth (IEEE 802.15.1), cellular or mobile networks (e.g., Code-Division Multiple Access or “CDMA,” Time-Division Multiple Access or “TDMA,” Long-Term Evolution or “LTE,” etc.), satellite networks, or the like. Communication interface(s) 403 may be used to communicate with peripheral devices (e.g., Bluetooth speakers, microphones, headsets, etc.). Moreover, communication interface(s) 403 may be coupled to chipset 402 via a Peripheral Component Interconnect Express (PCIe) bus, or the like.

Chipset 402 may be coupled to display and/or touchscreen controller(s) 404, which may include one or more Graphics Processor Units (GPUs) on a graphics bus, such as an Accelerated Graphics Port (AGP) or PCIe bus. As shown, display controller(s) 404 provide video or display signals to one or more display device(s) 405. Display device(s) 405 may include Liquid Crystal Display (LCD), Light Emitting Diode (LED), Organic LED (OLED), or other thin film display technologies. Display device(s) 405 may include a plurality of pixels arranged in a matrix, configured to display visual information, such as text, two-dimensional images, video, three-dimensional images, etc. In some cases, display device(s) 405 may be provided as a single continuous display, rather than two discrete displays.

Chipset 402 may provide host processor(s) 401 and/or display controller(s) 404 with access to system memory 406. In various embodiments, system memory 406 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 402 may also provide host processor(s) 401 with access to one or more Universal Serial Bus (USB) ports/controllers 407, to which one or more peripheral devices may be coupled (e.g., integrated or external webcams, microphones, speakers, etc.).

Chipset 402 may further provide host processor(s) 401 with access to a disk controller 408, which may include a disk interface that connects the disc controller 408 to a Hard Disk Drive (HDD), an Optical Disk Drive (ODD), an SSD, and/or a disk emulator. The disk interface may include, for example, an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. The disk emulator may be provide an external interface that permits one or more hard disk drives, solid-state drives, optical drives, or other removable-media drives to be connected to IHS 400. An example of external interface includes a USB interface, an IEEE 1394 (Firewire) interface, a proprietary interface, or a combination thereof.

Chipset 402 may also provide access to one or more user input devices 409, for example, using a super I/O controller or the like. Examples of user input devices 409 include, but are not limited to, a keyboard 409*a*, pointing device 409*b*, such as a mouse, trackball, stylus, or active pen, and/or microphone(s) 409*c*. Other user input devices 409 (not shown) may include a camera, touchpad, totem, etc. Each user input device 409 may include a respective controller (e.g., a touchpad may have its own touchpad controller) that interfaces with chipset 402 through a wired or wireless connection, for example via communication interfaces(s) 403 and/or USB port(s) 407. Other input devices, such as keyboard 409*a*, may use a keyboard controller in an operating system.

In some cases, chipset 402 may also provide access to one or more output devices, such as an audio subsystem 410, speakers, headsets, video projectors, paper printers, 3D printers, Virtual/Augmented Reality (VR/AR) devices, etc. The output devices may be accessed, for example, via communication interfaces(s) 403 and/or USB port(s) 407. Audio subsystem 410 may include speakers, which comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap such that when an electrical signal is applied to the voice coil, a magnetic field is created by the electric current in the voice coil, making it a variable electromagnet. The coil and the driver’s magnetic system interact, generating a mechanical force that causes the coil (and thus, the attached cone) to move back and forth, thereby reproducing sound under the control of the applied electrical signal coming from the amplifier.

In certain embodiments, chipset 402 may further provide an interface for communications with one or more hardware sensors 411. Sensors 411 may be disposed on or within the chassis of IHS 400, or otherwise coupled to IHS 400, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

A Basic Input and Output System/Unified Extensible Firmware Interface (BIOS/UEFI) 412 is coupled to chipset 402. UEFI was designed as a successor to BIOS, and many modern IHSs utilize UEFI in addition to or instead of a BIOS. Accordingly, BIOS/UEFI 412 is intended to also encompass a UEFI component. BIOS/UEFI 412 provides an abstraction layer that allows the OS to interface with certain hardware components that are utilized by IHS 400. Upon booting of IHS 400, host processor(s) 401 may utilize program instructions of BIOS 412 to initialize and test hardware components coupled to IHS 400, and to load a host OS for use by IHS 400. Via the hardware abstraction layer provided by BIOS/UEFI 412, software stored in system memory 406 and executed by host processor(s) 401 can interface with I/O devices coupled to IHS 400.

An Embedded Controller (EC) 413 (sometimes referred to as a Baseboard Management Controller or "BMC") includes a microcontroller unit or processing core dedicated to handling selected IHS operations not ordinarily handled by host processor(s) 401. Examples of such operations may include, but are not limited to: power sequencing, power management, receiving and processing signals from a keyboard or touchpad, as well as other buttons and switches (e.g., power button, laptop lid switch, etc.), receiving and processing thermal measurements (e.g., performing cooling fan control, throttling CPUs and GPUs, controlling colling fan speeds, and emergency shutdown), controlling indicator Light-Emitting Diodes (LEDs) (e.g., caps lock, scroll lock, num lock, battery, ac, power, wireless LAN, sleep, etc.), managing the battery charger and the battery, enabling remote or Out-of-Band (OOB) management, diagnostics, and remediation over network(s), and the like.

Unlike other devices in IHS 400, EC 413 may be made operational from the very start of each power reset, before other devices are fully running or powered on. As such, EC 413 may be responsible for interfacing with a power adapter to manage the power consumption of IHS 400. These operations may be utilized to determine the power status of IHS 400, such as whether IHS 400 is operating from battery power or is plugged into an AC power source. Firmware instructions utilized by EC 413 may be used to manage other core operations of IHS 400 (e.g., turbo modes, maximum operating clock frequencies of certain components, etc.).

In some cases, EC 413 may implement operations for detecting certain changes to the physical configuration or posture of IHS 400 and managing other devices in different configurations of IHS 400. For instance, when IHS 400 as a 2-in-1 laptop/tablet form factor, EC 413 may receive inputs from a lid position or hinge angle sensor 411, and it may use those inputs to determine: whether the two sides of IHS 400 have been latched together to a closed position or a tablet position, the magnitude of a hinge or lid angle, etc. In response to these changes, the EC may enable or disable certain features of IHS 400 (e.g., front or rear facing camera, etc.).

In some implementations, EC 413 may be installed as a Trusted Execution Environment (TEE) component to the motherboard of IHS 400. Additionally, or alternatively, EC 413 may be further configured to calculate hashes or signatures that uniquely identify individual components of IHS 400. In such scenarios, EC 413 may calculate a hash value based on the configuration of a hardware and/or software component coupled to IHS 400. For instance, EC 413 may calculate a hash value based on all firmware and other code or settings stored in an onboard memory of a hardware component.

In addition, EC 413 may provide an Out-of-Band communication channel that allows an Information Technology Decision Maker (ITDM) or Original Equipment Manufacturer (OEM) to manage IHS 400's various settings and configurations, for example, by issuing OOB commands.

In various embodiments, IHS 400 may be coupled to an external power source through an AC adapter, power brick, or the like. The AC adapter may be removably coupled to a battery charge controller to provide IHS 400 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 414 may be coupled to EC 413 and it may include, for example, an Analog Front End (AFE), storage (e.g., non-volatile memory), and a microcontroller. In some cases, BMU 414 may be configured to collect and store information, and to provide that information to other IHS components.

Examples of information collectible by BMU 414 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information or state (e.g., such as ambient temperature, relative humidity, system geolocation measured by GPS or triangulation, time and date, etc.), events, etc. Examples of events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, IHS 400 may not include all the components shown in FIG. 4. Furthermore, some components that are represented as separate components in FIG. 4 may instead be integrated with other components, such that all or a portion of the operations executed by the illustrated components may instead be executed by the integrated component. For example, in various embodiments described herein, host processor(s) 401 and/or other components shown in FIG. 4 (e.g., chipset 402, display controller(s) 404, communication interface(s) 403, EC 413, etc.) may be replaced by other devices. As such, IHS 400 may assume different form factors including, but not limited to: servers, workstations, desktops, laptops, appliances, video game consoles, tablet computers, smartphones, etc.

FIG. 5 illustrates an example use case for system using secure searchable encryption with semi-hidden access control. A data owner 501, such as a medical facility that collects patient data having various attribute values, needs to securely store and share the patient data. The data owner 501 encrypts the attribute values in the patient data and creates an index of the encrypted attribute values. The data owner then sends 502 the encrypted attribute values (document cipher) and the index (index cipher) to a cloud server 503. Although a cloud server is referred to in this example, it will be understood that the encrypted data may be stored in any data server accessible via any public, private, or enterprise network.

One or more data users 504 desire to access the data collected by data owner 501. The data users 504 are interested in certain attributes, such as a patient name, a diagnosis, a treating physician, prescription information, etc. The data users send 505 the names of those attributes to an authorization center 506, which converts the attribute names to attribute keys that are returned 507 to the data users. The data users 504 use the keys to create a trapdoor, which are sent 508 to the cloud server 503. The cloud server uses the trapdoor to identify the encrypted attribute values of interest to the data users and returns 509 the encrypted attribute values (ciphertext message) to the data users 504.

In an example configuration, a method comprises storing encrypted data attributes to a data server, generating an encrypted index for each attribute name, generating a trapdoor from a search keyword supplied by a user, sending the trapdoor to the database server, retrieving the search keyword from the trapdoor at the database server, using the search keyword at the database server to retrieve encrypted data attributes, verifying authenticity of the encrypted data attributes, and sending verified encrypted data attributes to the user.

The data attributes used in the method may be encrypted using the equation:

$$C_v = Enc_k(V)$$

wherein V represents an unencrypted attribute value, k is a symmetric encryption key, and Cv is an encrypted value of the unencrypted attribute value.

The encrypted index used in the method may be generated using the equation: $I_n$=Hash(N) wherein N is the attribute name, and In is a hash-based index.

The trapdoor used in the method is generated using the equation:

$$T_k = Enc_s(H(k))$$

wherein Tk is the trapdoor, k is the search keyword, H is a cryptographic hash function, and s is a secret key used in the encryption process.

The method may further comprise verifying that the user is authorized to generate a trapdoor; and distributing the secret key to the authorized user.

The authenticity of the encrypted data attributes in the method may be verified using the equation:

$$\text{Verify}_{pk} = (C_{sig}, H(C))$$

wherein pk is a public key corresponding to a private key used to sign the encrypted data attributes. The encrypted data attributes may be signed using the formula:

$$C_{sig} = \text{Sign}_{sk}(H(C))$$

where C is an encrypted data attribute, H is a cryptographic hash function, sk is a private key of an owner of the encrypted data attribute, and Csig is the digital signature of the encrypted data attribute.

The attribute separation module may be configured to segregate encrypted data attributes from attribute names. The attribute separation module may be configured to encrypt data attributes and generating an encrypted index for each attribute name.

The trapdoor privacy module may be configured to generate a trapdoor for a search keyword.

In the method, a ciphertext authenticity module may be configured to sign encrypted data attributes and to verify that encrypted data attributes have not been altered. The ciphertext authenticity module may be configured to sign the encrypted data attributes using a secret key of a data owner and to verify that encrypted data attributes have not been altered using a public key corresponding to the secret key.

An example database server comprises a processor and a memory coupled to the processor. The memory has program instructions stored thereon that, upon execution, cause the processor to: receive encrypted data attributes from a data owner, store the encrypted data attributes using an encrypted index, receive a trapdoor from a data user, retrieve a search keyword using the trapdoor, retrieve encrypted data attributes using the search keyword and the encrypted index, verify authenticity of the retrieved encrypted data attributes, and send the encrypted data attributes to the user. The data attributes may be encrypted using a symmetric encryption key. The encrypted index may be generated using a hash function. The trapdoor may be generated using a cryptographic hash function and a secret key. The authenticity of the encrypted data attributes is verified using a public key corresponding to a private key used to sign the encrypted data attributes. The encrypted data attributes may be signed using a cryptographic hash function, a private key, and a digital signature of the encrypted data attribute.

The database server may comprise a ciphertext authenticity module that is configured to sign encrypted data attributes and to verify that encrypted data attributes have not been altered. The ciphertext authenticity module may be configured to verify that encrypted data attributes have not been altered using a public key corresponding to a data owner secret key.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method, comprising:

storing encrypted data attributes to a database server, wherein the data attributes are encrypted using the equation:

$$C_v = Enc_k(V),$$

and wherein V represents an unencrypted attribute value, k is a symmetric encryption key, and Cv is an encrypted value of the unencrypted attribute value;

generating an encrypted index for each attribute name;

generating a trapdoor from a search keyword supplied by a user;

sending the trapdoor to the database server;

retrieving the search keyword from the trapdoor at the database server;

using the search keyword at the database server to retrieve encrypted data attributes;

verifying authenticity of the encrypted data attributes; and sending verified encrypted data attributes to the user.

2. The method of claim 1, wherein the encrypted index is generated using the equation:

$$I_n = \text{Hash}(N),$$

wherein N is the attribute name, and In is a hash-based index.

3. The method of claim 1, wherein the trapdoor is generated using the equation:

$$T_k = Enc_s(H(k)),$$

wherein Tk is the trapdoor, k is the search keyword, H is a cryptographic hash function, and s is a secret key used in the encryption process.

4. The method of claim 3, further comprising:

verifying that the user is authorized to generate a trapdoor; and distributing the secret key to the authorized user.

5. The method of claim 1, wherein the authenticity of the encrypted data attributes is verified using the equation:

$$\text{Verify}_{pk} = (C_{sig}, H(C)),$$

wherein pk is a public key corresponding to a private key used to sign the encrypted data attributes.

6. The method of claim 5, further comprising:

signing the encrypted data attributes using the formula:

$$C_{sig} = \text{Sign}_{sk}(H(C)),$$

where C is an encrypted data attribute, H is a cryptographic hash function, sk is a private key of an owner of the encrypted data attribute, and Csig is the digital signature of the encrypted data attribute.

7. The method of claim 1, wherein an attribute separation module is configured to segregate encrypted data attributes from attribute names.

8. The method of claim 7, wherein the attribute separation module is configured to encrypt data attributes and to generate an encrypted index for each attribute name.

9. The method of claim 1, wherein a trapdoor privacy module is configured to generate a trapdoor for a search keyword.

10. The method of claim 1, wherein a ciphertext authenticity module is configured to sign encrypted data attributes and to verify that encrypted data attributes have not been altered.

11. The method of claim 10, wherein the ciphertext authenticity module is configured to sign the encrypted data attributes using a secret key of a data owner and to verify that encrypted data attributes have not been altered using a public key corresponding to the secret key.

12. A database server, comprising:

a processor; and a memory coupled to the processor, the memory having configured with program instructions stored thereon that, upon execution, cause the processor to:

receive encrypted data attributes from a data owner;

store the encrypted data attributes using an encrypted index, wherein the encrypted index is generated using the equation:

$$I_n = \text{Hash}(N),$$

and wherein N is the attribute name, and In is a hash-based index;

receive a trapdoor from a data user;

retrieve a search keyword using the trapdoor;

retrieve encrypted data attributes using the search keyword and the encrypted index;

verify authenticity of the retrieved encrypted data attributes; and send the encrypted data attributes to the user.

13. The database server of claim 12, wherein data attributes are encrypted using the equation:

$$C_v = Enc_k(V),$$

wherein V represents an unencrypted attribute value, k is a symmetric encryption key, and Cv is an encrypted value of the unencrypted attribute value.

14. The database server of claim 12, wherein the trapdoor is generated using the equation:

$$T_k = Enc_s(H(k)),$$

wherein Tk is the trapdoor, k is the search keyword, H is a cryptographic hash function, and s is a secret key used in the encryption process.

15. The database server of claim 12, wherein the authenticity of the encrypted data attributes is verified using the equation:

$$\text{Verify}_{pk} = (C_{sig}, H(C)),$$

wherein pk is a public key corresponding to a private key used to sign the encrypted data attributes.

16. The database server of claim 12, further comprising: signing the encrypted data attributes using the formula:

$$C_{sig} = \mathrm{Sign}_{sk}(H(C)),$$

where C is an encrypted data attribute, H is a cryptographic hash function, sk is a private key of an owner of the encrypted data attribute, and Csig is the digital signature of the encrypted data attribute.

17. The database server of claim 12, further comprising: a ciphertext authenticity module is configured to sign encrypted data attributes and to verify that encrypted data attributes have not been altered.

18. The database server of claim 17, wherein the ciphertext authenticity module is configured to verify that encrypted data attributes have not been altered using a public key corresponding to a data owner secret key.

* * * * *